(12) United States Patent
Andrei et al.

(10) Patent No.: US 10,300,857 B2
(45) Date of Patent: May 28, 2019

(54) INTERIOR MIRROR FOR A MOTOR VEHICLE

(71) Applicant: SMR Patents S.à.r.l., Luxembourg (LU)

(72) Inventors: Stefan Andrei, Bietigheim (DE); Hans-Dieter Pomparew, Esslingen (DE)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 15/879,088

(22) Filed: Jan. 24, 2018

(65) Prior Publication Data
US 2018/0208117 A1 Jul. 26, 2018

(30) Foreign Application Priority Data
Jan. 24, 2017 (DE) .................. 10 2017 101 297

(51) Int. Cl.
*B60R 1/04* (2006.01)
*B60R 1/08* (2006.01)

(52) U.S. Cl.
CPC ............... *B60R 1/086* (2013.01); *B60R 1/04* (2013.01)

(58) Field of Classification Search
None
See application file for complete search history.

(56) References Cited

U.S. PATENT DOCUMENTS

| | | | | |
|---|---|---|---|---|
| 2,645,158 A | * | 7/1953 | Bertell | B60R 1/086 359/602 |
| 2,839,964 A | * | 6/1958 | Ponce | B60R 1/086 359/606 |
| 2,843,017 A | * | 7/1958 | Ponce | B60R 1/086 359/606 |
| 2,993,410 A | | 7/1961 | Bertell et al. | |
| 2,995,982 A | * | 8/1961 | Scheitlin | B60R 1/086 359/606 |
| 3,004,473 A | * | 10/1961 | Arthur | B60R 1/086 359/606 |
| 3,026,771 A | * | 3/1962 | Knowlton | B60R 1/087 359/606 |
| 3,076,384 A | * | 2/1963 | Nelson | B60R 1/086 359/606 |
| 3,279,315 A | * | 10/1966 | Albers | B60R 1/086 359/606 |
| 3,467,465 A | * | 9/1969 | Van Noord | B60R 1/086 248/479 |

(Continued)

FOREIGN PATENT DOCUMENTS

| | | |
|---|---|---|
| DE | 10 2015 219 105 A1 | 5/1916 |
| DE | 10 2012 108 482 A1 | 4/2014 |

OTHER PUBLICATIONS

German Office Action dated Aug. 14, 2017.

*Primary Examiner* — Derek S. Chapel
(74) *Attorney, Agent, or Firm* — Jones Day

(57) ABSTRACT

An interior minor for a motor vehicle, including a housing and a minor element held within it, can be tipped between a day position and a night position by means of at least one actuation element, where a direction of actuation of the at least one actuation element corresponds to a transverse direction of the interior minor in a central installation position.

11 Claims, 3 Drawing Sheets

(56) References Cited

U.S. PATENT DOCUMENTS

| | | | | |
|---|---|---|---|---|
| 4,457,586 A | * | 7/1984 | Sharp | B60R 1/086 |
| | | | | 359/603 |
| 4,679,906 A | * | 7/1987 | Brandenburg | B60R 1/086 |
| | | | | 359/606 |
| 5,520,063 A | * | 5/1996 | Santo | B60R 1/086 |
| | | | | 248/483 |
| 6,227,675 B1 | | 5/2001 | Mertens et al. | |

* cited by examiner

INTERIOR MIRROR FOR A MOTOR VEHICLE

CROSS-REFERENCE TO RELATED APPLICATIONS

This application claims the benefit of foreign priority to German Patent Application No. DE 10 2017 101 297.4, filed Jan. 24, 2017, which is incorporated by reference herein in its entirety for all purposes.

BACKGROUND

1. Field of the Invention

The following description relates to an interior mirror for a motor vehicle. For example, an interior mirror for a motor vehicle may include a housing and a mirror element held within it, which can be tipped between a day position and a night position by means of at least one actuation element. An actuation direction of the at least one actuation element here may correspond to a transverse direction of the interior mirror in a central installation position.

2. Related Art

Interior mirrors in motor vehicles are known and typically serve to enable the driver of the motor vehicle to view traffic behind the motor vehicle in their field of view.

At least one problem exists in that, during nighttime driving, the headlights of motor vehicles from the rear view are strongly reflected in such an interior mirror and can therefore dazzle the driver. For this reason, such interior mirrors usually have a dimming mechanism. This mechanism can be realized by the use of a prism mirror as a mirror element. The prism mirror is typically v-shaped in its cross-sectional profile and has two mirror surfaces arranged diagonally to each other, which have different degrees of reflectivity. This prism mirror can be tipped by means of an adjustment mechanism so that one of the mirror surfaces reflects the rear field of view of the driver. During nighttime, the less reflective mirror surface may be used, while the more strongly reflective mirror surface may be used during daytime.

The actuation of this dimming mechanism usually functions using an actuation element which is actuated in a central installation location of the interior mirror by the driver in the direction of the longitudinal vehicle axis. This is done in order to effect the tipping of the prism mirror. As a result, this may disadvantageously lead to a simultaneous displacement of the mirror position. Further, the desired image may no longer projected into the field of view of the driver, and the driver must re-adjust the mirror with some effort.

A conventional interior mirror such as that described above is described in U.S. Pat. No. 6,227,675 B1. A prism mirror arranged in a housing can be tipped between a day position and a night position by means of an operating lever. The operating lever is supported on a spring and protrudes downwards through an opening of the housing in the installation position of the interior mirror. The operating direction of the operating lever corresponds to the longitudinal vehicle axis.

German Patent Application No. DE 10 2015 219 105 A1 describes an interior mirror with a fixed reflector and a tipping reflector, which is arranged on the rear side of the fixed reflector in a housing. The tipping reflector is arranged in a day position surface that is parallel to the fixed reflector and can be tipped into a night position in which it is inclined with respect to the fixed reflector. A rotatable actuation lever, which is arranged in the installation position on the underside of the housing, actuates the tip reflector via a tappet connection. To switch over between the day position and the night position, the actuation lever in the installation position of the interior mirror is essentially rotated around the vertical vehicle axis.

Other typically used alternatives include self-dimming mirrors which no longer have a movement mechanism but instead use an electrochromic layer on the mirror element. This layer can be darkened when current is applied in order to reduce the dazzling effect of the headlights of cars driving behind the vehicle. Such self-dimming mirrors do not entail the mechanical problems described above but they are costly to produce and require expensive active control electronics. An adjustment mechanism for an outer or interior mirror is described in German Patent Application No. DE 10 2012 108 482 A1, and U.S. Pat. No. 2,993,410 describes a generic interior mirror.

SUMMARY

In an aspect, it is at least one object of the following description to develop generic interior mirrors to include a simple design and be capable of adjusting between a day and a night position without risk of displacement of the mirror position.

In an aspect, an interior mirror for a motor vehicle, with a housing and a mirror element held within it, which can be tipped between a day position and a night position by means of at least one actuation element, where a direction of actuation of the at least one actuation element corresponds to a transverse direction of the interior mirror in a central installation position, includes a switching device for tipping the mirror element, which includes a switching element which is mechanically actively connected with the mirror element, a first switching disk which is mechanically actively connected with the switching element and which is rotatably supported on an axis of the housing, and a second switching disk which is coaxially supported with the first switching disk.

The transverse direction may be classified in such a manner that this direction corresponds to the central installation position of the interior mirror of the transverse vehicle direction. This is usually simultaneously the direction of extension of the longest edge of the mirror element, or also of the housing. If the mirror element is used as a prism mirror, the above transverse direction simultaneously corresponds to the running direction of the wedge cut of the mirror element. In other words, the direction of actuation may essentially lie within an area which is defined by the mirror element.

As a result, an operation of the interior mirror is enabled in which with regard to the central installation position of the interior mirror, the user is no longer required to apply force in the direction of the longitudinal vehicle axis, so that any unintentional displacement of the mirror position can be avoided. At the same time, complex triggering electronics or costly vaporization of the mirror element with electrochromic layers is not required.

Through such an arrangement of switching element and switching disks, a lateral rotation movement of the switching disks, i.e. an actuation movement, can be converted into a tipping movement of the mirror element along the above-named transverse direction.

The switching disks may be rotatable between a first switch position in which the mirror element is in the day position and a second switch position in which the mirror element is in the night position. In other words, the switching disks have a defined room for maneuver between the end or resting positions, which are preferably limited by corresponding end stops so that the mirror element can be reliably and accurately tipped into the desired positions.

The first switching disk may include a first actuation element, which protrudes in the first switch position out of a first opening of the housing, and the second switching disk may include a second actuation element, which protrudes in the second switch position out of a second opening of the housing.

Further, in each case, the only actuation element accessible to the user is the one which they require to switch over into the respective other switch position, so that erroneous operation is reliably precluded, and the user can feel correct actuation element by touch without any further problems arising.

The first and/or second actuation element may be backlit and/or is fluorescent and/or colored. This is particularly advantageous for the night operation of the motor vehicle since, in this manner, the respective actuation element can also be easily recognized in darkness. Here, "fluorescent" means every possible form of "self-illuminating", the use of a phosphorescent dye, for example. For the backlit design of the respective actuation element, a light source can be directly integrated into the actuation element. However, the light source can also be arranged in the housing of the interior mirror, wherein the actuation element can be designed as being partially transparent or as a light conductor.

The first and second opening may be arranged on a lower lateral surface of the housing in the central installation position of the interior mirror, so that the respective actuation elements are particularly easy to reach for the driver of the motor vehicle.

The first opening in the second switch position may be closed by at least one of the switching disks, and the second opening in the first switch position may be closed by at least one of the switching disks. As a result, it may be ensured that the respective opening, through which in a given switch position no actuation element protrudes outwards, is sealed in a dust-tight manner, so that no dirt which may impair the functioning of the adjustment mechanism can penetrate the housing interior.

The switching disks may be brought from the first to the second switch position by actuating the first actuation element, and from the second to the first switch position by actuating the second actuation element. The respective actuation element may be immersed in the housing and close the related opening. The other respective actuation element may emerge from the other respective opening, so that the reverse switching movement is enabled.

The switching disks may be held by a brake spring in a respective resting position when the actuation element is not actuated. As a result, a situation may be avoided in which the position of the mirror element or the switching disks is displaced of its own accord, for example as a result of vibrations during operation of the motor vehicle. At the same time, the brake spring may specify a defined actuation force so that a desired switching sensation is realized for the user.

The switching disks may be coupled via a pre-tension spring, such as by a yoke spring, so that the joint movement of the switching disks is secured. At the same time, a certain dampable movement tolerance may be provided by the pre-tension spring.

The first and/or the second switching disk may have a diagonal running element on which the switching element glides. For example, the axis element of the switching element may glide.

By means of such an arrangement, the rotational movement of the switching disks can be converted into a tipping movement of the switching element, which due to the mechanical coupling between the switching element and the mirror element again results in the desired tipping movement of the mirror element. The axis element may at the same time exert a certain spring force onto the switching disks, so that it is ensured that the switching element—and thus also the mirror element—cannot become loosened from the mechanical coupling with the switching disks.

BRIEF DESCRIPTION OF DRAWINGS

The following description will be explained in greater detail below on the basis of exemplary embodiments with reference to the drawings, in which.

DETAILED DESCRIPTION

Figure 1:
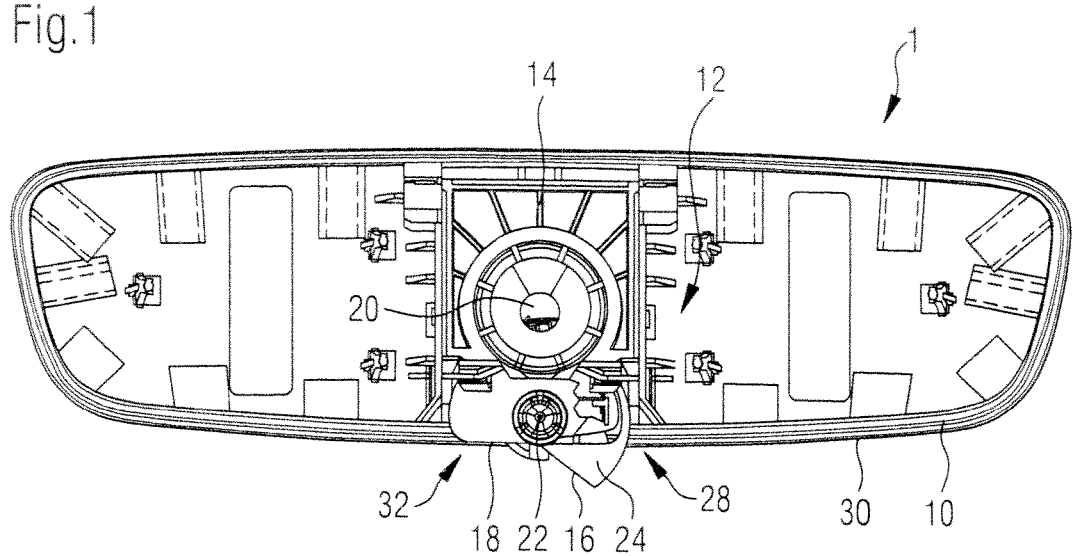
FIG. 1 is a diagram illustrating a top view of an example of a mirror housing of an interior mirror.

An interior mirror 1 for a motor vehicle has a housing 10, in which a mirror element not shown in the figures is arranged. The mirror element can be tipped between a day and a night position to realize a dimming function of the interior mirror 1, wherein in the view shown in FIG. 1, tipping occurs from the paper plane, or into the paper plane.

In order to tip the mirror element, a switching device 12 is provided which has a switching element 14 and two switching disks 16, 18. In the depiction shown in FIG. 1, the switching disk 18 is here essentially covered by the switching disk 16.

The switching element 14 is supported on a ball joint 20, and can, as also described with reference to the mirror element, be tipped relative to the paper plane. The tipping of the switching element 14 may be effected through a movement of the switching disks 16, 18. The switching disks 16, 18 may be rotatably supported on a clip holder 22 and have respective actuation elements 24, 26. This can be seen particularly clearly in FIGS. 4 and 5.

The switching disks 16, 18 are rotatable between two switch positions, and impact the switching element 14 as a result of the rotation movement. In particular, the switching element 14, as can best be seen in FIG. 3, lies on a diagonal running plane 27 of the switching disks 16, 18, so that a rotation movement of the switching disks 16, 18 is converted into the desired tipping movement of the switching element 14.

In the first switch position seen in FIG. 1, the actuation element 24 of the first switching disk 16 protrudes out of an opening 28 of a lower housing edge 30, while a further opening 32 of the lower housing edge 30 is closed by the switching disks 16, 18, so that the housing remains dust-tight.

If the actuation element 24 of the switching disk 16 is now pressed in the direction of the lower housing edge 30, the switching disks 16, 18 rotate, the actuation element 26 of the second switching disk 18 emerges out of the opening 32, while the opening 28 is closed by the switching disks 16, 18. At the same time, the switching element 14, and thus also the mirror element, tips as a result.

Figure 2:
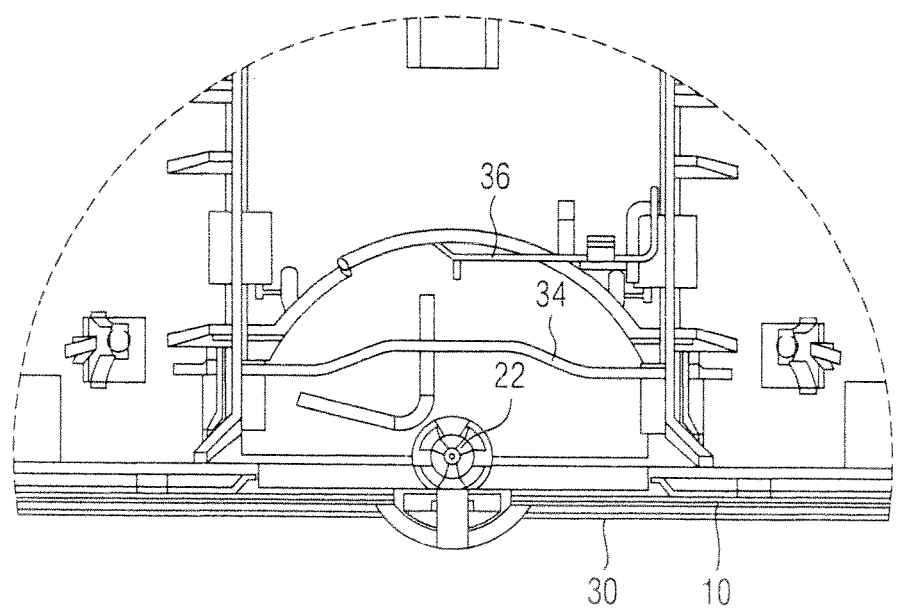
FIG. 2 is a diagram illustrating a detailed view of the housing of FIG. 1 with a holding element for switching disks for mirror actuation.

In FIG. 2, the holding area of the housing 10 for the switching disks 16, 18 is shown again in detail. It can be seen that the clip holder 22 for the switching disks 16, 18 is arranged in the area of the lower housing edge 30, so that the actuation elements 24, 26 can protrude in the desired manner out of the housing through a rotation of the switching disks 16, 18.

Further, it can be seen that spring elements 34, 36 are provided in the holding area for the switching disks 16, 18 which can serve as brake springs so that the switching disks 16, 18 can be held in their respective end positions and cannot be displaced involuntarily.

Figure 3:
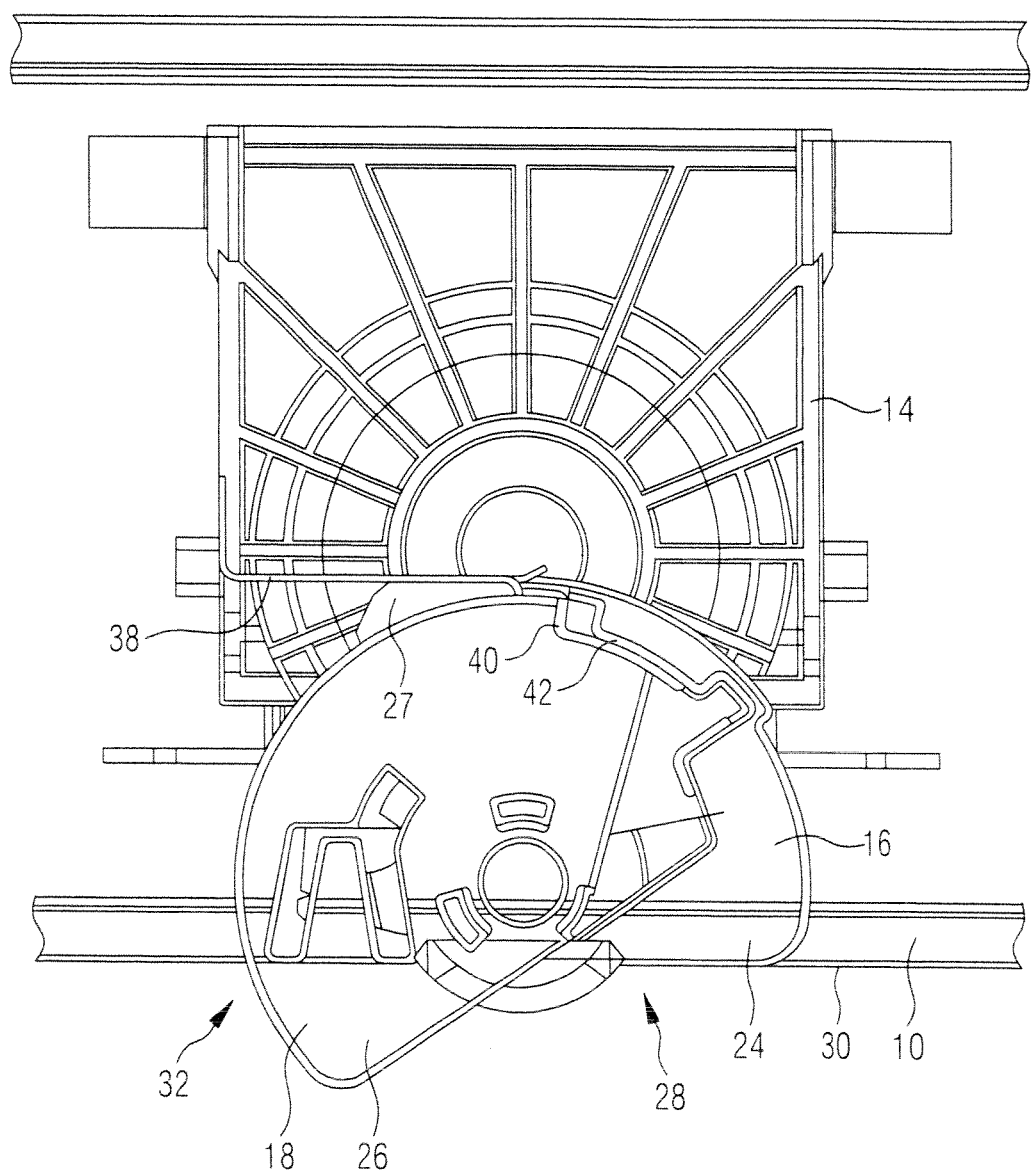
FIG. 3 is a diagram illustrating a detailed view of the housing of FIG. 1 with installed switching disks and a switching element for tipping a mirror element (not shown).

FIG. 3 illustrates the holding area for the switching disks 16, 18 and the switching element 14 in detail. Here, the switching disks 16, 18 are shown in the contrary switch position to that in FIG. 1, in other words, here the actuation element 26 protrudes out of the housing opening 32, while the housing opening 28 is closed by the switching disks 16, 18 and the actuation element 24 of the switching disk 16 is pulled back into the housing 10. In addition, it can here be seen that a metallic spring 38 presses the switching element 14 onto the switching disks 16, 18, so that the respective parts reliably always remain in contact and there is no undesired room for maneuver.

Figure 4:
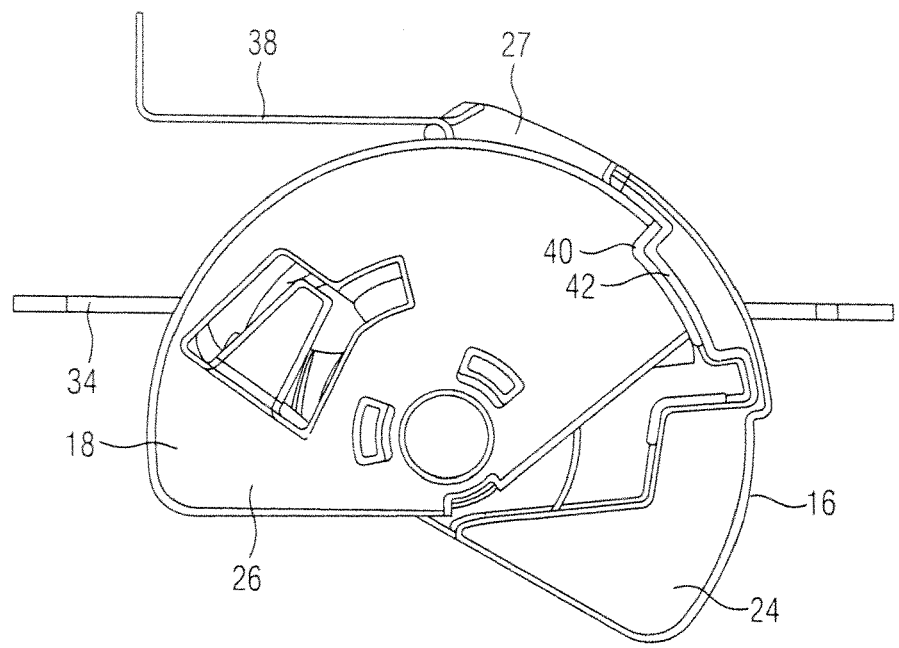
FIG. 4 is a diagram illustrating a schematic view of a first switching disk for an example of an interior mirror.
Figure 5:
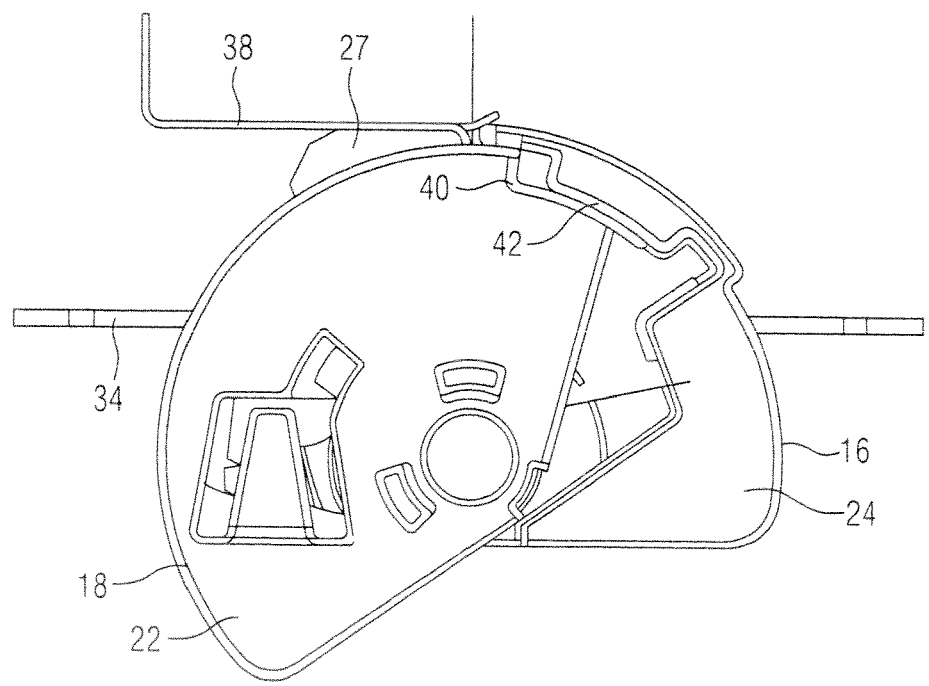
FIG. 5 is a diagram illustrating a schematic view of a further switching disk for an example of an interior mirror.

The two switch positions of the switching disks 16, 18 are additionally depicted in FIGS. 4 and 5. In this detailed view, it can be seen that the spring 38 lies on the running surface 27 and thus transmits the movement of the switching disks 16, 18 onto the switching element 14. It can further be seen that the switching elements 16, 18 each have carriers 40, 42, via which the switching elements 16, 18 are coupled during rotation, so that they move jointly, regardless of which of the actuation elements 24, 26 is actuated.

The features of the invention disclosed in the above description, the appended claims and in the drawings can be essential both individually and in any combination required for the realization of the invention in its different embodiments.

LIST OF REFERENCE NUMERALS

1 Interior mirror
10 Housing
12 Switching device
14 Switching element
16 Switching disk
18 Switching disk
20 Ball joint
22 Clip holder
24 Actuation element
26 Actuation element
27 Running plane
28 Opening
30 Lower edge
32 Opening
34 Spring
36 Spring
38 Spring
40 Carrier
42 Carrier

The invention claimed is:

1. An interior minor for a motor vehicle with a housing and a mirror element held within it, which can be tipped between a day position and a night position by means of at least one actuation element, where a direction of actuation of the at least one actuation element corresponds to a transverse direction of the interior minor in a central installation position, the interior minor comprising:
   a switching device for tipping the minor element, which comprises:
      a switching element which is mechanically actively connected with the minor element;
      a first switching disk which is mechanically actively connected with the switching element and which is rotatably supported on an axis of the housing; and
      a second switching disk which is coaxially supported with the first switching disk.

2. The interior minor of claim 1, wherein the switching disks are rotatable between a first switch position in which the minor element is in the day position and a second switch position in which the minor element is in the night position.

3. The interior minor of claim 2, wherein the first switching disk comprises a first actuation element, which protrudes in the first switch position out of a first opening of the housing, and the second switching disk comprises a second actuation element, which protrudes in the second switch position out of a second opening of the housing.

4. The interior minor of claim 1, wherein at least one of the first and the second actuation element can be at least one of backlit, rendered fluorescent, and colored.

5. The interior minor of claim 1, wherein the first opening and the second opening are arranged on a lower lateral surface of the housing in the installation position of the interior mirror.

6. The interior minor of claim 1, wherein the first opening in the second switch position is closed by at least one of the switching disks, and the second opening in the first switch position is closed by at least one of the switching disks.

7. The interior minor of claim 1, wherein the switching disks are configured to be brought from the first to the second switch position by actuating the first actuation element, and from the second to the first switch position by actuating the second actuation element.

8. The interior minor of claim 1, wherein the switching disks are held by at least one brake spring in their respective resting position when at least one actuation element is not actuated.

9. The interior minor of claim 1, wherein the switching disks are coupled via a pre-tension spring, comprising at least one of a yoke spring and at least one carrier, and each switching disk comprises at least one carrier.

10. The interior minor of claim 1, wherein at least one of the first and the second switching disk has a diagonal running plane on which the switching element glides.

11. The interior minor of claim 10, wherein an axis element of the switching element glides.

* * * * *